United States Patent
Millen

[11] Patent Number: 6,050,539
[45] Date of Patent: Apr. 18, 2000

[54] COMPOSITE EQUIPMENT SUPPORT PAD

[75] Inventor: Frank Millen, Gaffney, S.C.

[73] Assignee: Pacolet Concrete Company, Gaffney, S.C.

[21] Appl. No.: 09/107,961

[22] Filed: Jun. 30, 1998

[51] Int. Cl.[7] .................................................. F16M 9/00
[52] U.S. Cl. .......................................... 248/678; 248/679
[58] Field of Search .................................... 248/678, 679, 248/346.07, 346.01; 52/309.12, 292, 294, 590.2, 794.1, 405.1; 404/41, 44, 45

[56] References Cited

U.S. PATENT DOCUMENTS

| | | | |
|---|---|---|---|
| 1,430,392 | 9/1922 | Lukens | 404/41 |
| 2,840,430 | 6/1958 | Winer . | |
| 2,849,758 | 9/1958 | Plumley et al. . | |
| 3,004,777 | 10/1961 | Buonaccorsi . | |
| 3,424,413 | 1/1969 | Applegate . | |
| 3,722,845 | 3/1973 | Unger | 248/679 |
| 3,790,115 | 2/1974 | Fox et al. | 248/678 |
| 3,922,413 | 11/1975 | Reineman | 52/405.1 |
| 4,056,251 | 11/1977 | Dixon et al. . | |
| 4,067,164 | 1/1978 | McMillan . | |
| 4,084,362 | 4/1978 | Piazza . | |
| 4,186,536 | 2/1980 | Piazza . | |
| 4,212,446 | 7/1980 | Domanick et al. . | |
| 4,229,497 | 10/1980 | Piazza . | |
| 4,399,975 | 8/1983 | Trimarco et al. | 248/678 |
| 4,505,449 | 3/1985 | Turner et al. . | |
| 4,869,456 | 9/1989 | Jacobs | 248/678 |
| 4,883,918 | 11/1989 | Browning | 248/678 |
| 5,076,534 | 12/1991 | Adam | 248/678 |
| 5,149,050 | 9/1992 | Smith et al. | 248/679 |
| 5,333,830 | 8/1994 | Millen | 248/678 |
| 5,540,524 | 7/1996 | Gonsalves | 52/294 |
| 5,895,025 | 4/1999 | Alesi et al. | 248/678 |

FOREIGN PATENT DOCUMENTS 2332373  6/1977  France .

OTHER PUBLICATIONS

Advertisement—Lightweight Conventional Concrete Pads—Diversitech Corp.
Advertisement—Ultralite Concrete Pad—Diversitech Corporation.
Advertisement—Lightweight Equipment Pads—Pacolet Concrete Const.

Primary Examiner—Leslie A. Braun
Assistant Examiner—Debbie Short
Attorney, Agent, or Firm—Dority & Manning

[57] ABSTRACT

A support pad is provided having a lightweight core component defining an essentially open space between side walls thereof. An interlocking pattern, such as alternating recesses and extensions, are defined along the side walls of the core component. A hard formable shell material, such as concrete, generally surrounds the core component along the side walls and upper surface thereof. The shell material forms within the recesses along at least one of the side walls and non-movably sets the core component within the shell material. The interlocking pattern or recesses defined on the sides of the core component are configured so that any number or pattern of core components can be interconnected depending on the sides and configuration of the desired support pad.

31 Claims, 3 Drawing Sheets

COMPOSITE EQUIPMENT SUPPORT PAD

BACKGROUND OF THE INVENTION

The present invention relates generally to an equipment support pad, and in particular to a lightweight equipment support pad having a hard shell and generally hollow interior.

The high cost of concrete bases or pads poured on-site for various types of air conditioning, heating, and electrical equipment has given rise to a growing market for pre-cast concrete pads. Such pre-cast pads are usually less expensive than on-site poured pads; however they are generally very heavy and require heavy equipment or several laborers to set in place. Furthermore, such pads are expensive to ship and are prone to breakage.

Certain composite pads have been suggested for replacing the pre-cast concrete pads. For instance, U.S. Pat. No. 4,186,536 shows a pad having a foam core encapsulated in reinforced cementious material. U.S. Pat. No. 4,056,251 discloses a lightweight plastic transformer pad formed of plastic or other synthetic material having an upper surface and lower surface defining an internal cavity. A heat expansive foam material is poured into the cavity.

U.S. Pat. No. 4,505,449 suggests a composite pad having an expanded foam core, such as polystyrene foam board, with a fiber glass reinforced cement material forming a solid base. Steel coils are embedded in the composite material for reinforcing steel post or the like which serve to mount air conditioners or other heavy equipment.

U.S. Pat. No. 5,333,830 discloses a support pad having a cellular core member laminated between a top facing sheet and a bottom facing sheet. The core member is embedded in a cementious shell material defining the support surface. The cellular core member may be formed of paper or other fibrous material and the cellular structure offers a relatively high degree of rigidity and structural support without adding unnecessary weight to the support pad.

The industry is constantly seeking improvements in support pads to reduce weight without sacrificing strength or capacity, while also reducing the cost and complexity of such support pads.

An additional problem frequently encountered with conventional support pads utilizing foam or fibrous core members, particularly in relative hot climates such as the southeastern United States, is that insects and rodents seem to find the form or cellulose core materials attractive for nests, etc. For example, the support pads utilizing foam cores are particularly attractive to fire ants, which tend to break up the core material and carry away the small foam core particles. In certain instances, the ants have carried the particles into the controls of the air conditioner compressor, or other equipment, which has actually caused the equipment to shut down. Field mice and other small rodents have been known to build nests in the cellular core members of the type of support pad described in U.S. Pat. No. 5,333,830.

The present invention provides an alternative cementious support pad having an improved lightweight core that does not detrimentally affect the rigidity and structural integrity of the pad, yet which is relatively inexpensive and easy to manufacture while at the same time being unattractive to pests, rodents, and the like.

OBJECTS AND SUMMARY OF THE INVENTION

It is a principal object of the present invention to provide a composite equipment support pad for supporting heavy equipment which is generally lightweight, having a generally hollow interior, without sacrificing structural support or strength of the pad.

A further object of the present invention is to provide a composite equipment support pad wherein the weight of the pad is substantially reduced making it easier to handle such pads during shipment and installation.

Still a further object of the present invention is to provide a heavy equipment pad that is unattractive to insects, pests, rodents, and the like.

And yet another object of the present invention is to provide a lightweight core member for a cementious support pad that does not have to be sealed or otherwise isolated from the elements, and which is unattractive to pests, insects, rodents, and the like.

Additional objects and advantages of the invention will be set forth in part in the description which follows, and in part will be obvious from the description, or may be learned through practice of the invention. The objects and advantages of the invention may be realized and attained by means of the instrumentalities and combinations particularly pointed out in the appended claims.

In accordance with the objects of the invention, a composite support pad is provided having a support surface for supporting heavy equipment, such as air conditioning units, transformers, and the like. The pad includes at least one lightweight core component. The core component has an upper side and side walls defining an essentially open space within the boundaries of the side walls. The side walls of the core component define an interlocking pattern or configuration, such as alternating recesses and extensions. In this manner, any combination of such core components can be interconnected depending on the size of the support pad to be manufactured. Thus, only one size core component needs to be manufactured and stocked, yet a variety of sizes of support pads can be manufactured using any interconnected number of the core components.

A hard formable shell material generally surrounds the core component along the side walls and the upper surface. Thus, the side walls of the core component serve not only as interlocking means for adjacent core components, but also to ensure that the core component is securely embedded in the cementious shell material. The shell material is formed within the interlocking pattern, such as the recesses, along at least one of the side walls thereby non-movably setting the core component within the shell material. The shell material thus defines the upper equipment support surface and sides of the support pad with the core component embedded therein.

The upper side of the core component may be essentially open, and preferably includes at least one strip member connected between two of the side walls to ensure that the core component and side walls retain their shape prior to and during fabrication of the support pad, and to aid in placement of the core member in the pad.

In a preferred embodiment of the invention, a sheet material is disposed between the upper side of the core component and the shell material. For example, the sheet material may be glued or attached to the upper surface of the core component prior to setting the core component in the shell material. Preferably, the sheet material is porous to the shell material, which flows at least partially therethrough during the manufacturing process of the pad, and thus securely locks the core member within the pad.

In a preferred embodiment, the shell material is a cementious shell material and may further contain, for example, fiberglass fibers, or other reinforcing materials.

In one preferred embodiment of the invention, the interlocking pattern or configuration of the side walls is defined by edges which further define adjacent recesses and extensions. These recesses and extensions are connectable to oppositely facing extensions and recesses, respectively, in adjacent pads to interlockingly connect the core components. Thus, one core component can be attached to another core component along any side of either core component. It should be appreciated, however, that any interlocking pattern is within the scope and spirit of the invention.

The present invention also pertains to a core component for use in a cementious support pad for heavy equipment, wherein the core component is settable within the cementious material to define a rigid and lightweight support pad therewith. The core component is according to the description herein.

The accompanying drawings, which are incorporated in and constitute a part of the specification, illustrate one embodiment of the invention and, together with the description, serve to explain the principles of the invention.

DETAILED DESCRIPTION

Figure 1:
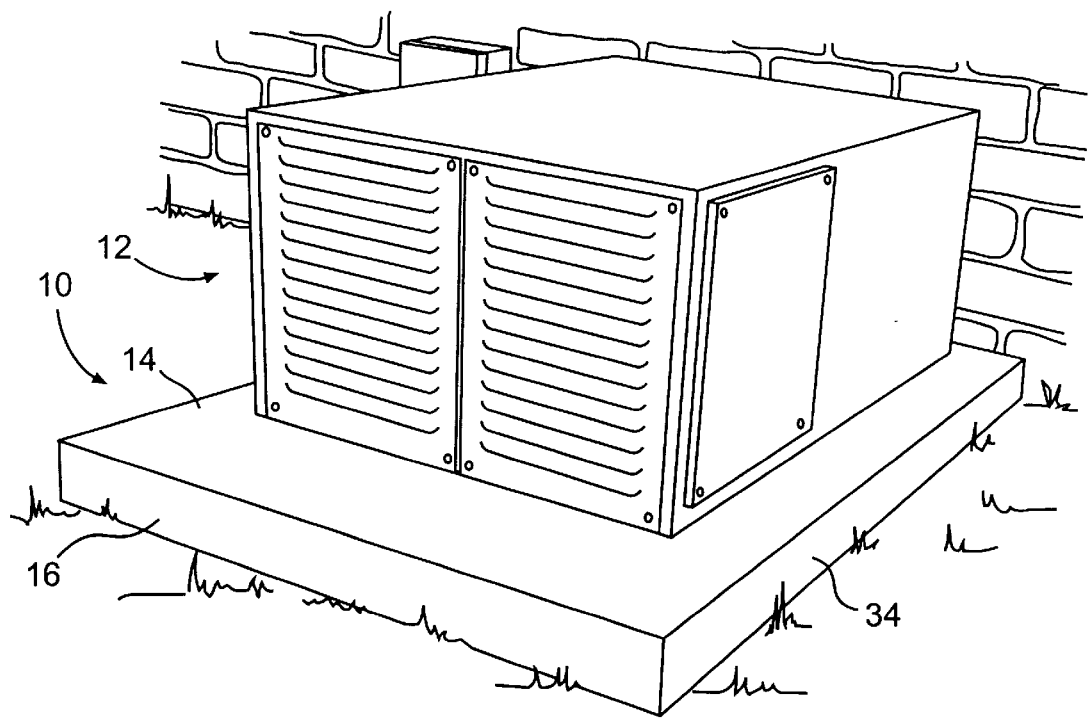
FIG. 1 is a perspective view of a support pad according to the invention in use.

Reference will now be made in detail to the presently preferred embodiments of the invention, one or more examples of which are illustrated in the drawings. Each example is provided by way of explanation of the invention, and not as a limitation of the invention. For example, it will be apparent to those skilled in the art that various modifications and variations can be made in the present invention without departing from the scope or spirit of the invention. For instance, features illustrated or described as part of one embodiment, can be used on another embodiment, to yield still a further embodiment. It is intended that the present invention include such modifications and variations as come within scope of the appended claims and their equivalents.

A composite equipment support pad 10 is provided for supporting heavy equipment 12 on an upper support surface 14 defined by sides 16, as particularly illustrated in FIG. 1. Support pad 10 is illustrated for convenience as rectangular or square in shape in the figures. It should be understood that support pad 10 is not limited to any particular shape and may just as well be circular, etc. Additionally, the type of heavy equipment supported by support pad 10 is not a limitation of the invention. For example, support pad 10 according to the invention may be used to support any manner of equipment or structure that must rest on a hard rigid base, including air conditioning units, heating units, electrical equipment, etc.

Support pad 10 includes at least one lightweight core component, 18. Core component 18 defines an upper side 20 and side walls 22. An open space or volume 24 is defined between walls 22 and upper side 20. In a preferred embodiment, core component 18 is formed from a moldable lightweight plastic material. However, core component 18 may be formed of any conventional lightweight rigid material.

Figure 4:
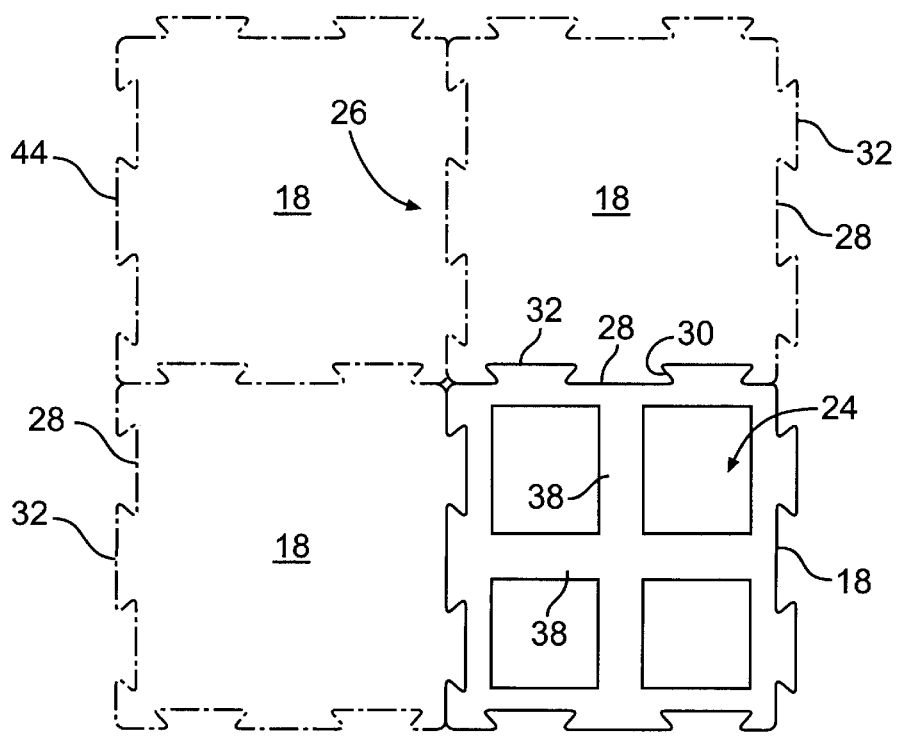
FIG. 4 is a partial diagrammatic view of interconnected core components.
Figure 5:
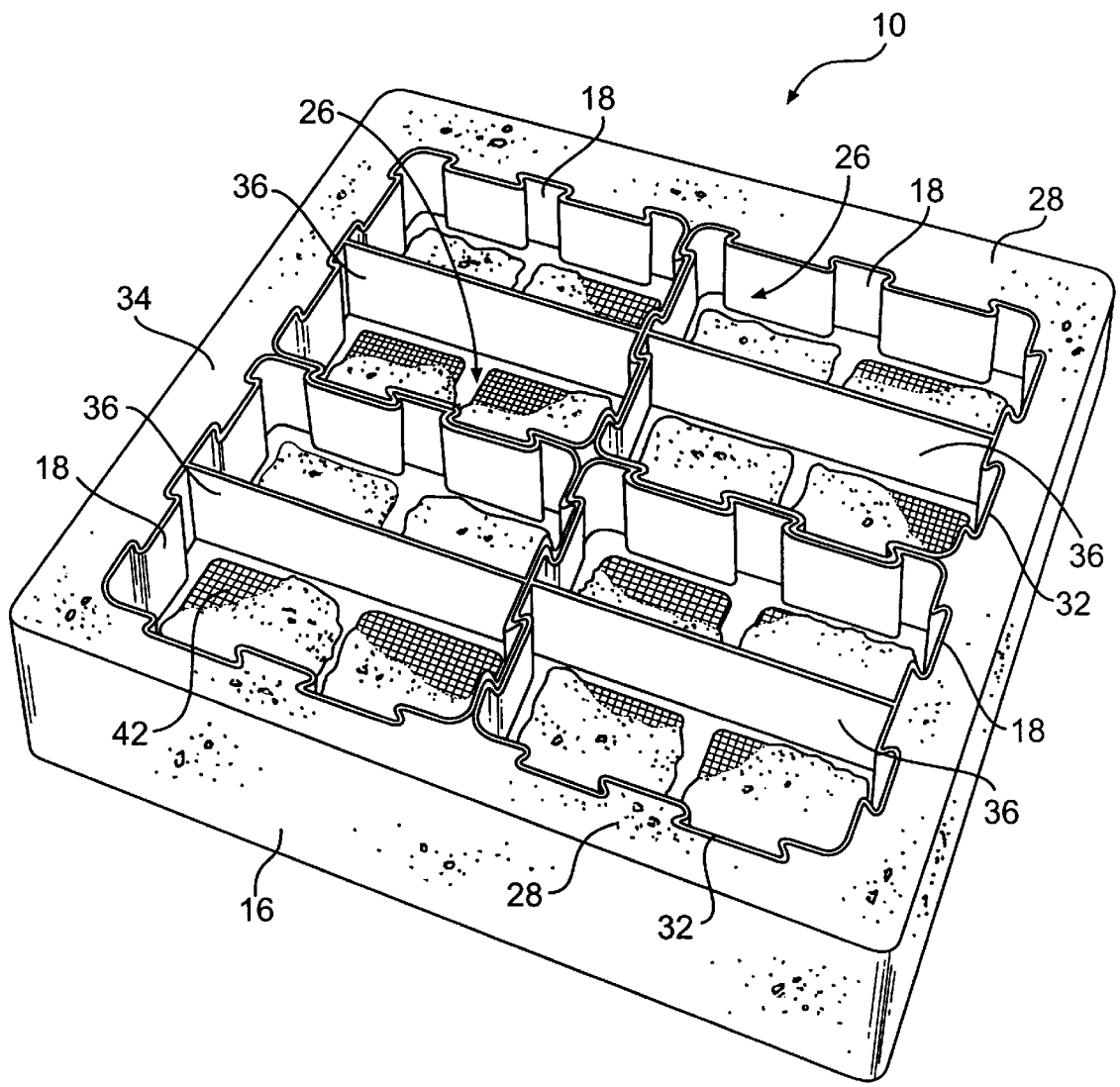
FIG. 5 is a perspective view of the underside of the support pad according to the invention.

An interlockable pattern, 26 is defined along side walls 22 of core component 18. This interlockable pattern 26 serves a dual purpose. Firstly, the interlocking pattern 26 allows for any combination of core components 18 to be interconnected depending on the size and configuration of support pad 10 to be fabricated. For example, FIGS. 4 and 5 illustrate an embodiment of support pad 10 wherein four separate core components 18 are interconnected along adjacent sides. Any number or pattern of core components can be interconnected in this regard. Thus, only a single size core component 18 needs to be manufactured, yet any size support pad 10 can be formed merely by interconnecting the desired pattern of core components 18.

In the embodiment illustrated in the figures, interlocking pattern 26 is defined by alternate recesses 28 and extensions 32 formed along sides 22 of core component 18. Thus, adjacent core components can fit together in a interlocking "puzzle" manner wherein extensions 32 of one core component 18 slide within recesses 28 of the adjacent core component 18. In the embodiment illustrated, recesses 28 and extensions 32 are directly adjacent along sides 22 and are separated by edges 30. Edges 30 may be angled, as illustrated in the figures, to define diverging recesses 28 and complimentary shaped extensions 32. This pattern ensures a secure locking of adjacent core components 18.

It should be appreciated that the interlocking pattern of recesses 28 and extensions 32 is but a mere example of any suitable interlocking edge configuration for core components 18. For example, the interlocking pattern 26 can comprise any conventional geometric shapes. Additionally, it is within the scope and spirit of the invention to employ external attaching devices or means, such as adhesives, clamps, etc., in order to interlock or otherwise securely fasten adjacently disposed core components 18.

It should also be appreciated that each individual core component 18 can have any desired dimensions. For conventional two inch support pads 10, applicant has determined that core component 18 should have a height of about 1½ inches wherein at least a half inch of shell material 34 is disposed above upper side 20 of core component 18 in the final support pad 10.

Sides 22 of core component 18 also serve to ensure that the core component is securely "locked" or embedded in the cementious shell material 34 by providing recesses or other strongholds for the cementious shell material 34 to flow into and form. For example, referring to FIG. 4, the interconnected pattern of core components 18 defines a perimeter 44 of alternating recesses 28 and extensions 32. When this interconnected network of core components 18 is formed in a pad 10, as illustrated in FIG. 5, cementious shell material 34 flows into recesses 28 disposed along perimeter 44 and thus securely locks core component 18 within pad 10 along the entire perimeter 44. Again, it should be appreciated that any pattern may be defined on sides 22 for this purpose.

Figure 3:
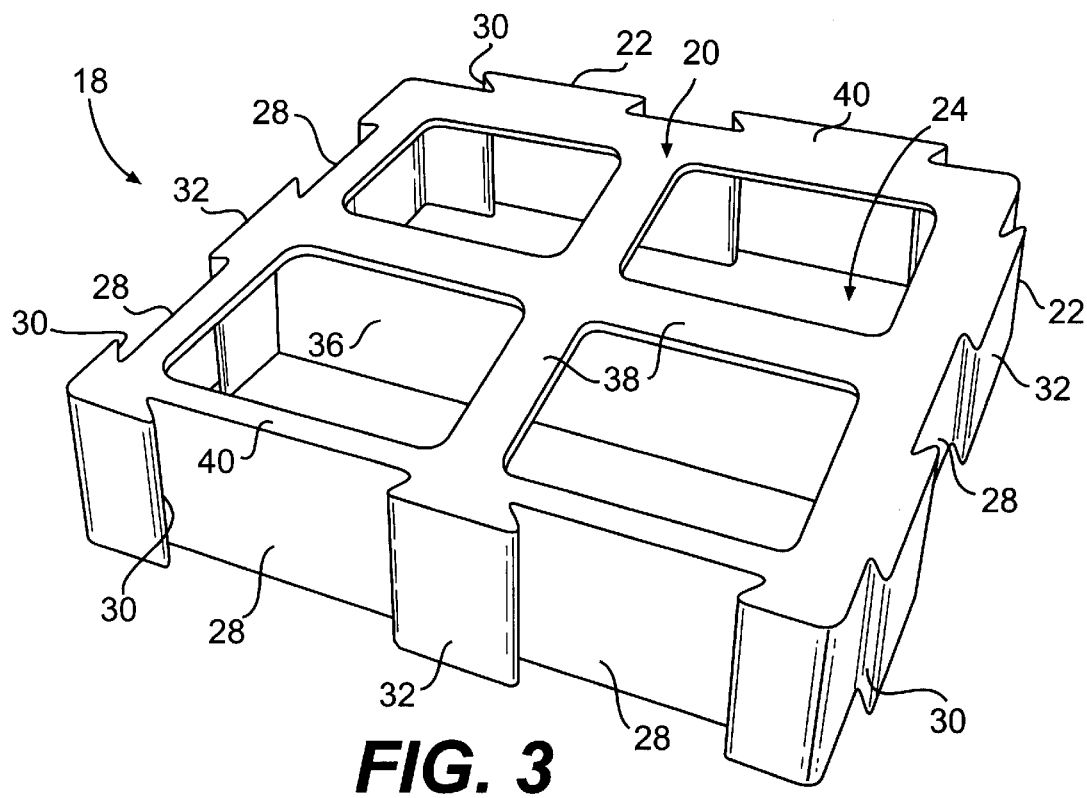
FIG. 3 is a perspective view of the core component of the support pad according to the invention.

Each core component 18 may further include any manner of additional reinforcing structure or members. For example, referring particularly to FIGS. 3 and 5, each core component 18 may include a reinforcing rib or member 36 extending between oppositely facing sides 22. Rib 36 serves to ensure that core component 18 maintains its pre-formed shape during storage and fabrication of support pads 10. Additionally, core component 18 preferably includes an open face upper side 20, as particularly illustrated in FIG. 3, defined by top side edges 40. Additional top strip members 38 may further define upper side 20. It is not necessary that upper side 20 be enclosed and, preferably, it is open to at least some extent so that shell material 14 can flow, at least to a limited extent, through open upper face 20 into open space or volume 24 and harden or form above edges 40, as particularly illustrated in FIG. 5, to additionally lock core component 18 within pad 10.

Figure 2:
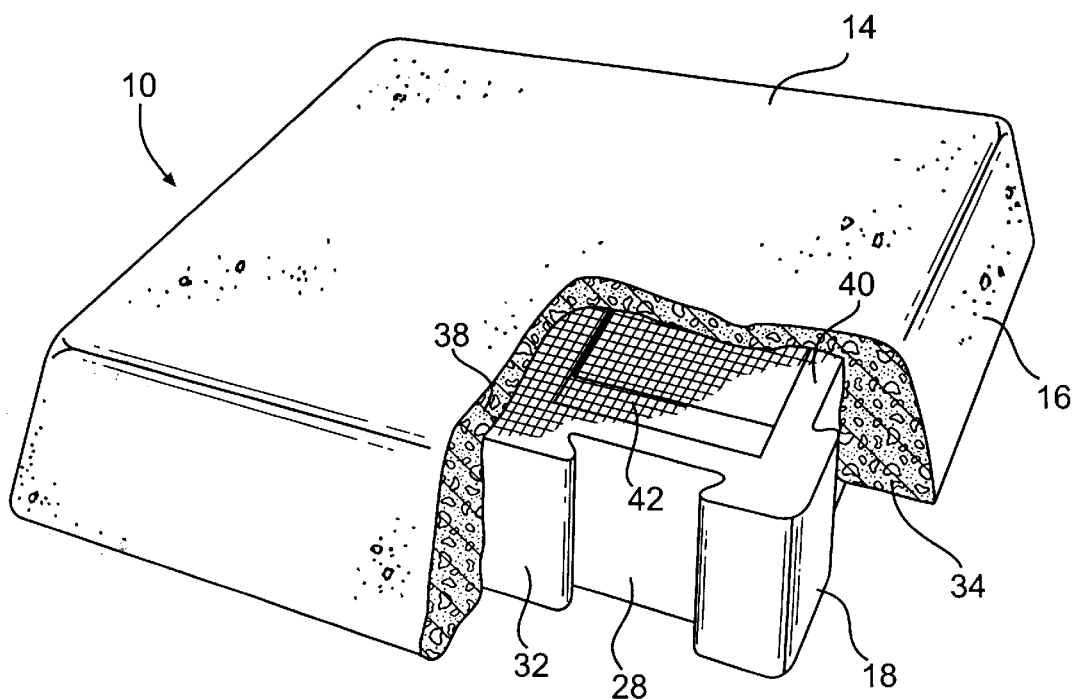
FIG. 2 is a partial cut-away view of a support pad according to the invention.

It may also be preferred to include a porous sheet material 42 between upper side 20 and shell material 34, as particularly illustrated in FIGS. 2 and 5. Sheet material 42 may be, for example, a screen or "scrim" material. Sheet material 42 may be glued or otherwise attached to upper surface 20. Sheet material 42 ensures that each core component 18 settles evenly during fabrication of pad 10 and is also porous enough to allow at least some of the shell material 34 to flow therethrough and harden or form within volume 24 to further lock core component 18 within the shell material.

Pad 10 includes a hard formable shell material, generally 34. Preferably, shell material 34 is a concrete or other hard material, such as a hard plastic or resin. The invention is not limited to any particular type of shell material 34, and includes any material that is sufficient for supporting equipment on support surface 14 of pad 10. Additionally, shell material 34 may further include other strengthening materials, such as fiberglass or propylene fibers oriented or otherwise admixed throughout. The fiber reinforcement of a concrete mass is known in the art and not inventive to the present invention. For example, Forta Corporation of Grove City, Pa., provides a commercially available line of fiber reinforcements for concrete available in mixer ready bags. The bags can be tossed directly into a cement mixer and are distributed throughout the concrete structure.

In order to form support pad 10 according to the invention, an initial pattern of core components 18 is assembled. For example, referring to FIGS. 4 and 5, a pattern of four core components 18 are interlocked as illustrated. An initial amount of shell material 34 is poured into a form for support pad 10. For example, for a conventional two inch pad 10, a half inch of material 34 is poured into the form. Next, the interconnected network of core components 18, with attached sheet material 42, is set into the form on top of the initial amount of shell material 34. Core components 18 may be physically manipulated so as to be centered within the form and also to permit at least a portion of shell material 34 to flow through upper side 20 and into space 24, if desired. Then, additional shell material 34 is poured around sides 22 of core component 18 to complete the sides 16 of support pad 10. Preferably, the edge surfaces of the core component sides are flush with shell material 34, as indicated in FIG. 5. Once shell material 34 has formed or hardened, pad 10 is removed from the form. Pad 10 thus defines a hard upper support surface 14 for equipment 12, as illustrated in FIG. 1, with a generally hollow interior defined within walls 22 of core components 18. Unlike the foam or cellular core members known in prior art support pads, core components 18 according to the present invention should not be attractive or inviting to pests, insects, and the like.

It should be appreciated by those skilled in the art that various modifications and variations can be made in the present invention without departing from the scope or spirit of the invention. It is intended that the present invention include such modifications and variations as come within the scope of the appended claims and their equivalents.

What is claimed is:

1. A composite support pad having a support surface for supporting heavy equipment, said pad comprising:
   at least one lightweight core component, said core component further comprising an upper side and side walls defining an essentially open space within said side walls;
   alternating recesses and extensions defined along said side walls, said recesses and extensions having a shape so as to be interlockable with respective extensions and recesses on additional said core components; and
   a hard formable shell material generally surrounding said core component along said side walls and said upper surface, said shell material formed within said recesses along at least one of said side walls thereby non-movably setting said core component within said shell material, said shell material further defining an upper equipment support surface.

2. The support pad as in claim 1, further comprising at least two of said core components interconnected along adjacent said side walls thereof to form a network of interconnected core components within said support pad.

3. The support pad as in claim 1, further comprising at least one reinforcing rib connected between two said side walls.

4. The support pad as in claim 1, wherein said upper side of said core component is essentially open.

5. The support pad as in claim 4, wherein said upper side of said core component further comprises at least one strip member connected between two said side walls.

6. The support pad as in claim 4, further comprising a sheet material disposed between said core component upper side and said shell material.

7. The support pad as in claim 6, wherein said sheet material is porous to said shell material, said shell material formed at least partially through said sheet material.

8. The support pad as in claim 1, wherein said shell material is a cementious material.

9. The support pad as in claim 1, wherein said extensions in said side walls comprise edges which further define edges of said recesses so that said extensions and recesses are disposed directly adjacent each other along said side walls.

10. The support pad as in claim 9, wherein said edges are angled to define diverging said recesses.

11. The support pad as in claim 1, wherein said core component is formed of a plastic material.

12. A composite support pad having a support surface for supporting heavy equipment, said pad comprising:
   a plurality of interconnected lightweight core components, each said core component further comprising an upper side and side walls defining an essentially open space within said side walls;
   an interlockable pattern defined along said side walls of each said core component wherein adjacent side walls of said interconnected core components are interlocked by said pattern, said interconnected core components further defining an outer perimeter of said side walls; and
   a hard formable shell material generally surrounding said outer perimeter of said interconnected core components and said upper surfaces of said core components thereby non-movably setting said interconnected core components within said shell material, said shell material further defining an upper equipment support surface.

13. The support pad as in claim 12, wherein said interlockable pattern comprises a pattern of alternating recesses and extensions, said shell material forming within said recesses along said outer perimeter.

14. The support pad as in claim 12, further comprising at least one reinforcing rib connected between two said side walls of said core components.

15. The support pad as in claim 12, wherein said upper side of said core components is essentially open.

16. The support pad as in claim 15, wherein said upper side of said core components further comprises at least one strip member connected between two said side walls.

17. The support pad as in claim 15, further comprising a sheet material disposed between said core component upper sides and said shell material.

18. The support pad as in claim 17, wherein said sheet material is porous to said shell material, said shell material formed at least partially through said sheet material into said open space within said side walls of said core components.

19. The support pad as in claim 12, wherein said shell material is a cementious material.

20. The support pad as in claim 12, wherein said interlockable pattern in said side walls comprise edges which further define alternating recesses and extensions.

21. The support pad as in claim 20, wherein said edges angled relative to said side walls so that said recesses are diverging.

22. The support pad as in claim 12, wherein said core components are formed of a plastic material.

23. A core component for use in a hard support pad for heavy equipment wherein said core component is settable within formable shell material to define a rigid and lightweight support pad therewith, said core component comprising a generally open frame structure having vertically extending side wall members defining an essentially open space therebetween, said side walls further configured in an interlockable pattern so that a plurality of said core components can be interconnected along said side walls, and wherein said interlockable pattern along said side walls also defines spaces into which said shell material forms to lock said core component in the support pad, said core component further comprising open spaces defined in an upper side thereof so that said shell material can form at least partially through said top surface.

24. The core component as in claim 23, wherein said core component is formed of a plastic material.

25. The core component as in claim 23, wherein said interlockable pattern comprises alternating recesses and extensions defined along said side walls.

26. The core component as in claim 23, further comprising at least one reinforcing rib connected between two said side walls.

27. The core component as in claim 23, wherein said upper side further comprises at least one strip member connected between two said side walls.

28. The core component as in claim 27, further comprising a sheet material attached to said upper side.

29. The core component as in claim 28, wherein said sheet material is porous to cementious material.

30. The core component as in claim 23, wherein said interlockable pattern is defined by edges which further define adjacent recesses and extensions along said side walls.

31. The core component as in claim 30, wherein said edges are angled relative to said side walls to define diverging said recesses.

* * * * *